(No Model.)
2 Sheets—Sheet 1.
E. W. LEHMAN.
CIDER PRESS.
No. 321,039. Patented June 30, 1885.
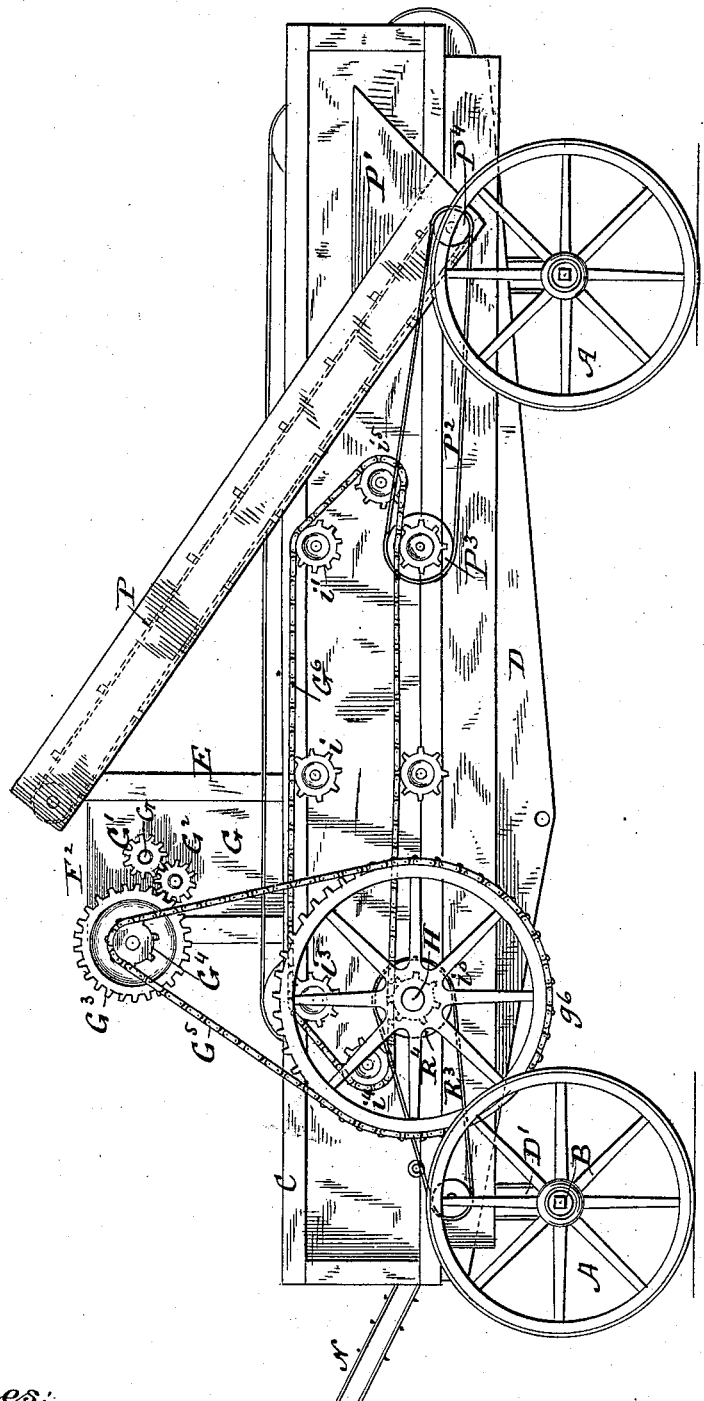
Witnesses:
L. C. Hills
W. B. Masson
Inventor
Emanuel W. Lehman
by E. E. Masson
atty.

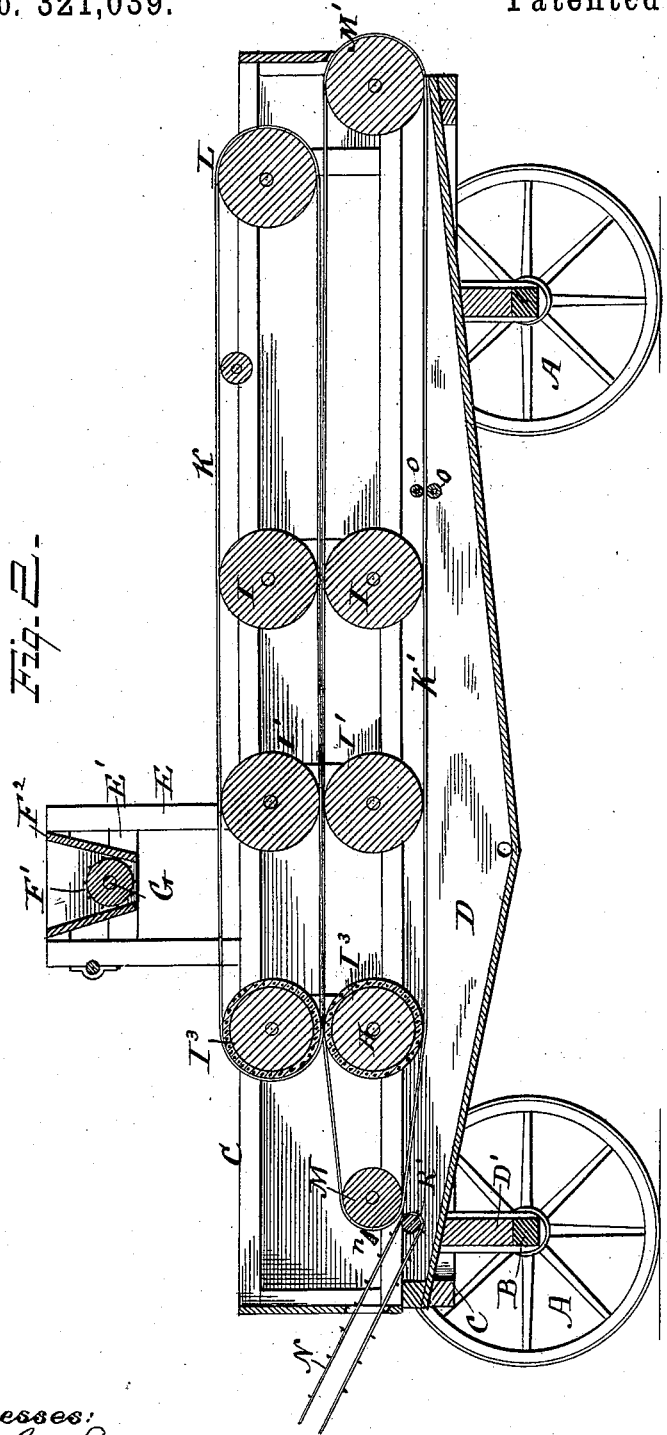

UNITED STATES PATENT OFFICE.

EMANUEL W. LEHMAN, OF CARLISLE, PENNSYLVANIA.

CIDER-PRESS.

SPECIFICATION forming part of Letters Patent No. 321,039, dated June 30, 1885.

Application filed November 6, 1884. (No model.)

*To all whom it may concern:*

Be it known that I, EMANUEL W. LEHMAN, a citizen of the United States, residing at Carlisle, in the county of Cumberland and State of Pennsylvania, have invented certain new and useful Improvements in Cider-Presses, of which the following is a specification, reference being had therein to the accompanying drawings.

My invention relates to a cider-mill wherein the apples are elevated to a grinding-cylinder and ground in a mill of suitable construction and then delivered to endless aprons which pass between and conduct the ground material to pressure-rollers to extract the cider from the pomace, the cider being deposited in a vat arranged beneath the belts and pressure-rollers, and the pomace discharged from the belts by suitable means, the entire machine being supported upon wheels or the running-gear of a wagon, to admit of convenient and rapid transit from place to place.

The improvement consists, primarily, in the combination of a series of rollers arranged in pairs, over which endless aprons are passed, and a grinding-roller arranged above the upper apron, upon which the ground apples are carried and delivered to one extended end of the lower apron, from whence they are conducted between the aprons and pressure-rollers and the pomace discharged at the opposite and extended end of the lower apron, as hereinafter appears.

The improvement further consists in combining a series of gradual non-elastic compression rollers arranged in pairs, one above the other, with a pair of rubber-covered final-pressure rollers, all connected together by chain-belts and endless aprons arranged one above the other, to pass around the upper and lower tiers of rollers to subject the ground apples first to the successive gradual pressure of non-elastic rollers, and finally to the compressive action of the elastic rollers.

The improvement further consists in combining the running-gear of a wagon with a body-vat secured to and extending from end to end thereof, and a mill-frame supporting grinding and compressing rollers and endless aprons, also supported upon the running-gear independently of the body-vat to cover the same, and made removable therefrom to give access to the interior of the vat.

The improvement also consists in the aprons and rollers arranged to operate, as described, with a pair of idler rubber rollers for drying the apron.

The improvement finally consists in specific combinations of pressure-rollers, aprons, and endless driving-chains with rollers for elevating the apples from the receiving-hopper to the grinding-cylinder and for discharging the pomace from the machine.

In the accompanying drawings, Figure 1 is a side elevation of my improved mill; Fig. 2, a central longitudinal section of the same.

The wheels A and axles B support a rectangular frame, C, and together therewith form the running-gear of the machine. A tank or vat, D, fits snugly within the frame C, and is provided with a bottom inclined downward from the ends to the middle portion thereof, and at its lowest point is provided with a discharge orifice and spout from which the cider may be drawn. The vat is preferably made of sheet metal to secure lightness and to admit of its being easily cleansed. The mill-frame is formed of two rectangular side frames, E, joined together at their ends in a suitable and substantial manner, that rest upon and are supported by the exterior frame, C, of the wagon, and may also be held in place thereon by hounds D', projecting upward from the axles in a manner similar to that of the wagon-bodies. A turret-frame, E, is supported upon the mill-frame toward the forward end of the frame, and supports a grinding-cylinder, F', and hopper $F^2$, which receives the apples from an endless belt, as will hereinafter appear. The grinding-cylinder F' is mounted upon the main driving-shaft G, which, through a train of gears, $G^7$ $G^2$ $G^3$ $G^4$, endless chain $G^5$, and master-wheel $g^6$, imparts motion to a counter-shaft, H, journaled in bearings upon the lower longitudinal timbers of the mill-frame, and serves to drive the pressure and compression-rollers of the machine in the following manner: The pressure-rollers I I I' I' and compression rollers $I^3$ $I^3$ are arranged in parallel pairs one above the other, and are secured to shafts journaled, respectively, to the upper and lower longitudinal timbers of the mill-frame, and are driven by endless chains G⁶, arranged upon opposite sides of the mill-frame, which chain passes over and engages with a train of sprocket-pinions, $i$ $i\,i'\,i'\,i^3$, secured to the ends of the roller-shaft, and also pass around sprocket-pinions or idlers $i^4$ $i^5$, arranged between and at either end of the above-mentioned train of sprocket-pinions, by which means all of the said rollers will be caused to revolve together, the upper and lower series being made to revolve in opposite directions. The counter-shaft H carries the lower compression-roller $I^3$, as well as the sprocket-pinion $i^3$, and thus serves to effect the revolution of the pressure and compression rollers. An endless apron, K, passes around the upper compression and pressure rollers, and also around the idler-rollers L, arranged at the end of the machine remote from the grinding-mill, and serves to conduct the ground material over the upper surface of the belt toward the roller L, at which point it falls upon the lower apron and is returned to the opposite end of the machine. The lower apron, K', passes around the lower compression and pressure rollers, and is extended at either end beyond the upper apron to pass around idler-rollers M M', arranged, respectively, at the forward and rear ends of the mill-frame. The rollers I I and I' I' are made of wood or unyielding material, and are supported at varying distances from contact with each other, to allow the aprons and pomace to pass between them and give to the latter successive pressures of increasing force, and are made of unyielding material to insure the crushing of any partly-ground apples which may have escaped from the grinding-mill. The final compression-rollers $I^3$ $I^3$ are covered with rubber or elastic material, and are placed so nearly in contact, one with the other, that the aprons and pomace are subjected to the full elastic force and compressive action of said rollers and practically freed from the cider or juices held by them. The elastic rollers will give the desired final pressure and allow any unyielding substance to pass without tearing the aprons. The compressed material is then carried to the rear extension of the lower apron around the roller M, from whence it is removed by the scraper $n$ and drops upon an endless apron, N, at the end of the machine and carried away from the machine. After delivering the dried pomace to the aprons N the lower carrying-apron, K', passes between the lower compression and pressure rollers, and thence between a pair of idler-rollers, O O, which serve to wring or squeeze from the apron any cider that may be held by it, and thus "dry" the apron to receive the next succeeding deposit of ground material to be delivered to it by the upper apron.

A novel feature of my invention consists in placing the grinding-cylinder over the upper apron and depositing the ground apples upon the upper side of said apron to be conducted to the forward end of the machine previous to the action of the pressure-rollers. The material will by this means have time to settle and distribute itself, or be distributed evenly over the aprons. Experience verifies that the juices can only be effectively expressed from the pomace by gradual and increasing pressures, as the pomace is sponge-like and will reabsorb the said juices after excessive pressure has been applied and before the juices can run off by their natural flow. The settling process which the material undergoes in its passage from the grinding-mill to the forward end of the machine will first free the pomace of excessive juices and deliver them comparatively dry to the action of the pressure-rollers. The elevated position of the grinding-cylinder requires that convenient means shall be employed for delivering the apples thereto from a lower elevation, accessible from the ground. This I accomplish by means of an elevator-apron, P, leading from a receiving-hopper, P', to the grinding-cylinder in a well-known manner. The hopper is conveniently arranged at the forward end and upon one side of the wagon, and the apron P is driven by a belt, $P^2$, passing over a pulley, $P^3$, upon the end of the shaft of the lower pressure-roller I, and a pulley, $P^4$, upon the end of the lower roller of the elevator-apron P, thus connecting the said elevator with the train of pressure-rollers. The pomace is scraped from the rear end of the lower apron, K', and discharged from the machine by an endless apron, N, which passes over rollers R', one of which is driven by a belt, $R^3$, passing over a pulley, $R^4$, secured to the end of the counter-shaft H.

The entire working mechanism will by the above-described construction be supported upon a frame-work made independently of and readily detachable from the tank or vat in which the cider is held, and access can thus be obtained to the interior of the tank for washing and thoroughly cleansing it after it has been used.

I claim as my invention and desire to secure by Letters Patent—

1. The combination, with a cider-mill, of the gradual non-elastic pressure-rollers I I I' I', arranged at varying distances one above the other, final compression-rollers covered with elastic material, the endless aprons arranged one above the other to pass around the upper and lower tier of rollers, and the endless chain for connecting the rollers, substantially as and for the purpose described.

2. The combination of the presser and compression-rollers arranged in pairs one above the other, the endless aprons arranged to pass around said rollers, and the idler-rubber O O, arranged in advance of the foremost pair of presser-rollers to wring the apron before its return to the forward end of the machine, substantially as described.

3. The combination, in a cider-mill, of the running-gear with the mill-frame E, rollers I I' I³, endless chain G', aprons K K', and apple-elevator apron P, and driving-belt P², all actuated from counter-shaft H, connected with the shaft of the grinding-cylinder, substantially as and for the purpose described.

4. The combination, in a cider-mill, of pressure-rollers I I' I³, the endless aprons K K', the counter-shaft H, driven from the shaft of the grinding-cylinder, and the endless apron N, supported upon rollers arranged relatively under the apron K' and driven from the center shaft H, substantially as and for the purpose described.

In testimony whereof I affix my signature in presence of two witnesses.

EMANUEL W. LEHMAN.

Witnesses:
JOHN SHAEFFER,
L. S. EISENHOWER.